US006801173B2

(12) United States Patent
Wiltshire

(10) Patent No.: US 6,801,173 B2
(45) Date of Patent: Oct. 5, 2004

(54) STRUCTURE WITH SWITCHABLE MAGNETIC PROPERTIES

(75) Inventor: Michael Charles Keogh Wiltshire, High Wycombe (GB)

(73) Assignee: Marconi Optical Components Limited, London (GB)

( * ) Notice: Subject to any disclaimer, the term of this patent is extended or adjusted under 35 U.S.C. 154(b) by 101 days.

(21) Appl. No.: 10/220,731

(22) PCT Filed: Mar. 6, 2001

(86) PCT No.: PCT/GB01/00957

§ 371 (c)(1), (2), (4) Date: Dec. 16, 2002

(87) PCT Pub. No.: WO01/67549

PCT Pub. Date: Sep. 13, 2001

(65) Prior Publication Data

US 2003/0146814 A1 Aug. 7, 2003

(30) Foreign Application Priority Data

Mar. 6, 2000 (GB) .......................................... 0005356

(51) Int. Cl.[7] .............................................. H01G 4/005
(52) U.S. Cl. ...................................... 343/787; 343/753
(58) Field of Search ................................ 343/895, 787

(56) References Cited

U.S. PATENT DOCUMENTS 5,621,422 A * 4/1997 Wang ......................... 343/895
5,729,239 A * 3/1998 Rao ........................... 343/753
6,088,214 A * 7/2000 Malone et al. .............. 361/278
6,608,811 B1 * 8/2003 Holden et al. .............. 361/303

FOREIGN PATENT DOCUMENTS

WO W0 01/67126 A1 9/2001

* cited by examiner

*Primary Examiner*—James Vannucci
(74) *Attorney, Agent, or Firm*—Venable LLP; Catherine M. Voorhees

(57) ABSTRACT

A structure (40) with switchable magnetic properties comprises: an array of capacitive elements (44) in which each capacitive element (44) includes a low resistance conducting path and is such that a magnetic component (H) of electromagnetic radiation (12) lying within a predetermined frequency band induces an electrical current (j) to flow around said path and through said associated element (44). The size of the elements (44) and their spacing (α) apart are selected such as to provide a predetermined permeability ($\mu$) in response to said received electromagnetic radiation (12). Each capacitive element (44) comprises a plurality of stacked planar sections (42) each or which comprises at least two concentric spiral conducting members or tracks (46, 48) which are electrically insulated from each other. A switchable permittivity material, such as Barium Strontium Titanate (BST) is provided between the tracks. The magnetic properties of the structure are switched by applying a dc electrical potential between the conducting tracks.

14 Claims, 6 Drawing Sheets

STRUCTURE WITH SWITCHABLE MAGNETIC PROPERTIES

This invention relates to a structure with switchable magnetic properties.

In certain applications it is advantageous if the magnetic permeability of a material can be tailored for that application at least within a specified frequency range and more especially if its magnetic permeability could be switched between selected values. In our co-pending UK Patent Application No. 2346485 (International Patent Application No. WO 00/41270) and in a publication entitled Magnetism from Conductors and Enhanced Non-Linear Phenomena, IEEE Transaction on Microwave Theory and Techniques, 1999, 47, 2075–2084, J B Pendry, A J Holden, D J Robbins and W J Stewart, a structured material is disclosed which exhibits a magnetic permeability at a selected frequency, typically a microwave frequency (GHz). The content of these documents is hereby incorporated by way of reference thereto.

The structured material described in these documents comprises an array of capacitive elements which include a low resistance electrically conducting path and in which the elements are arranged such that a magnetic component of electromagnetic radiation within a selected frequency band induces an electrical current to flow around the path and through the associated element. The size of the elements and their spacing are selected such as to provide a selected magnetic permeability in response to the electromagnetic radiation. Such a structure allows a material to be fabricated which is designed to have a selected fixed magnetic permeability for a selected frequency of electromagnetic radiation.

Figure 1A:
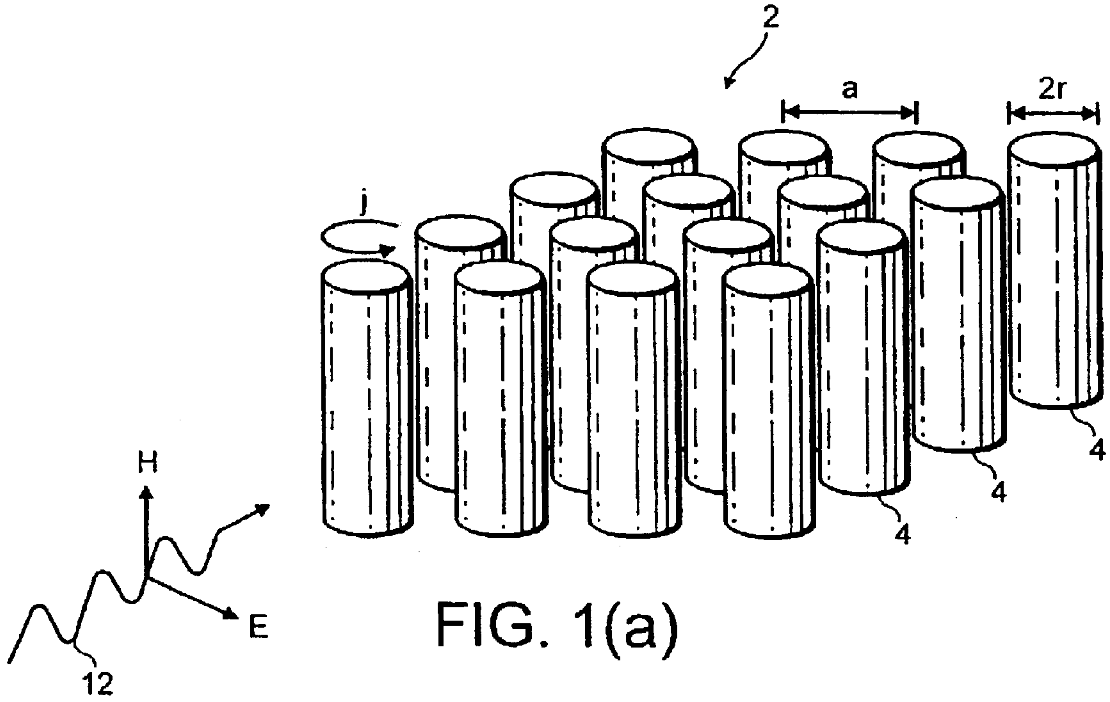
Figure 1B:
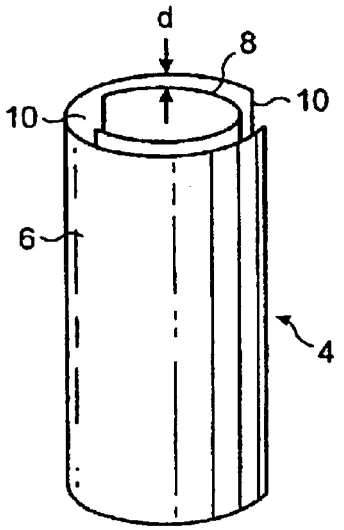

As shown in FIGS. 1(*a*) and (*b*) one such structured material 2 comprises an array of capacitive elements 4 each of which consists of two concentric metallic electrically conducting cylindrical tubes: an outer cylindrical tube 6 and an inner cylindrical tube 8. Both tubes 6, 8 have a longitudinal (i.e running in an axial direction) gap 10 and the two gaps 10 are offset from each other by 180°. The elements 4 are arranged in a regular square array and are positioned on centres at a distance a apart. The outer tube 6 has a radius r and the inner 8 and outer 6 cylindrical tubes are separated by a distance d. The gap 10 prevents the flow of dc electrical current around either of the cylinders 6, 8. However the self capacitance between the two cylindrical tubes 6, 8 allows an ac current, j, to flow when the material is subjected to electromagnetic radiation 12 having a magnetic field component H which is parallel to the axis of the tubes 6, 8. It is shown that such a structure has an effective magnetic permeability $\mu_{eff}(\omega)$ which is given by:

$$\mu_{eff}(\omega) = 1 - \left[ \frac{\frac{\pi r^2}{a^2}}{1 + \frac{2\sigma i}{\omega r \mu_0} - \frac{3dc_0^2}{\pi^2 \omega^2 r^3}} \right] \qquad \text{Eq. 1}$$

in which ω is the angular frequency, σ the resistivity of the cylindrical tubes, i the $\sqrt{-1}$ and $c_0$ the velocity of light. From Eq. 1 it can be seen that by appropriate selection of the size r and spacing a of the cylindrical tubes a structure having a selected magnetic permeability at a given frequency ω can be obtained.

Figure 2A:
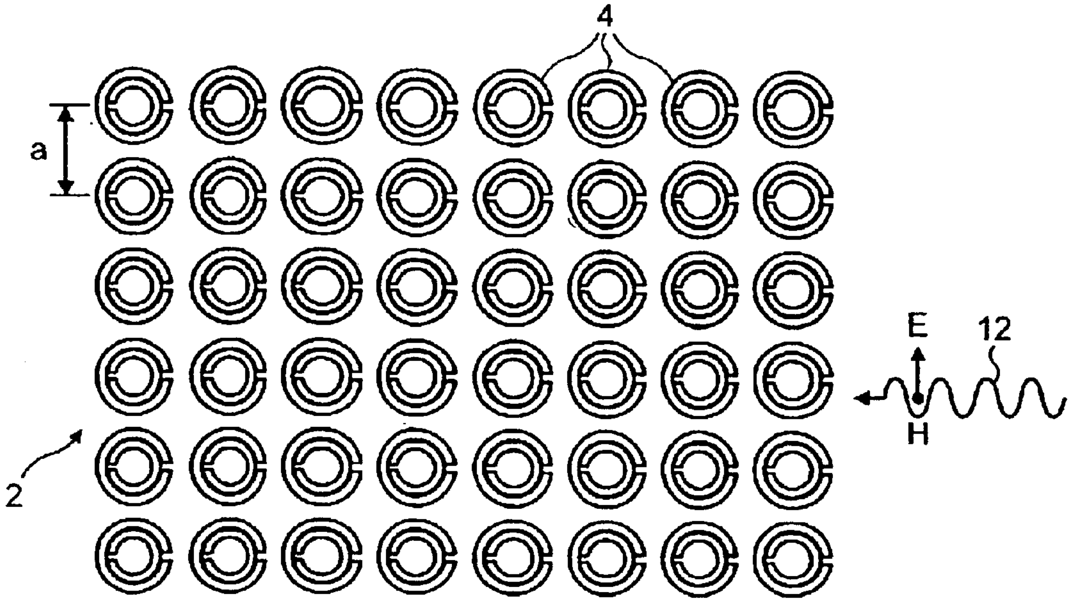
Figure 2B:
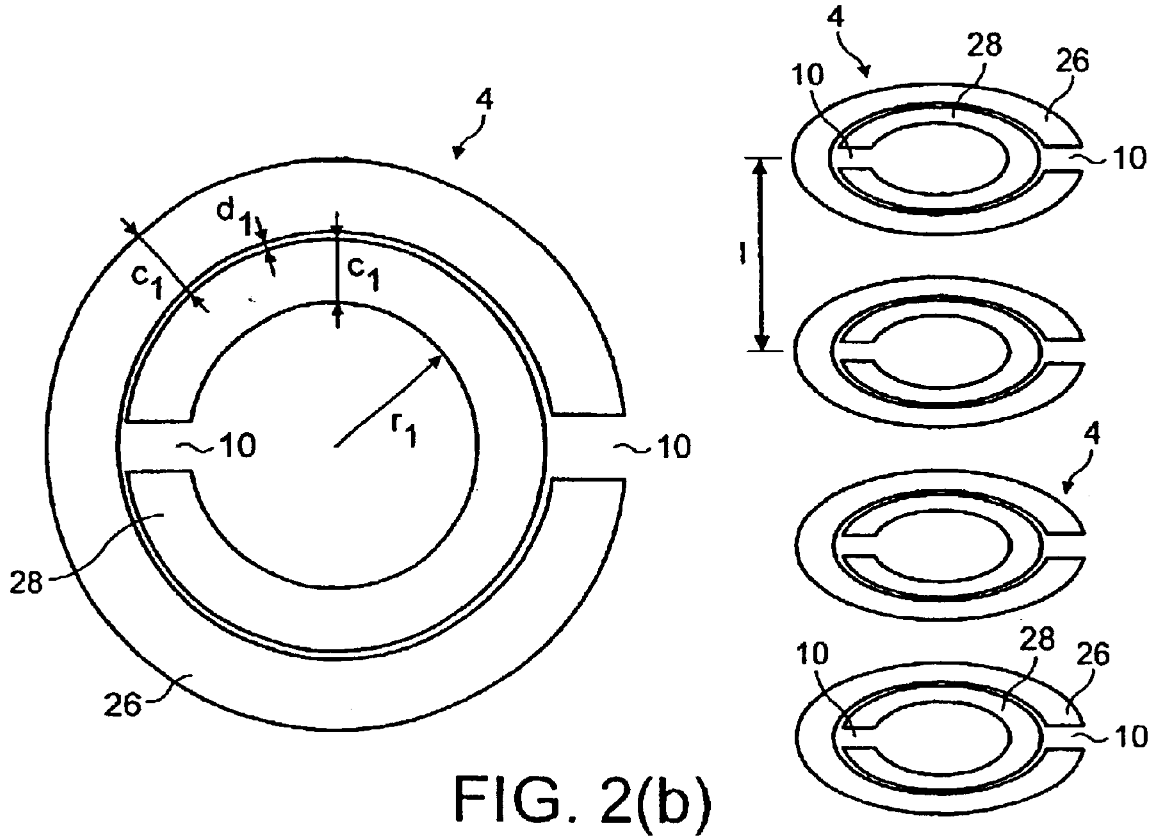

For ease of fabrication it proposed in UK Patent Application No. 2346485 (International Patent Application No. WO 00/41270) to construct each capacitive element 4 in the form of a stack of concentric split rings 26, 28 as shown in FIGS. 2(*a*) and 2(*b*). A stack of such rings is shown to be equivalent to the concentric cylindrical tubes described above and has a magnetic permeability given by:

$$\mu_{eff}(\omega) = 1 - \left[ \frac{\frac{\pi r_1^2}{a^2}}{1 + \frac{2l\sigma_1}{\omega r_1 \mu_0} i - \frac{3lc_0^2}{\pi \omega^2 r_1^3 \ln\left[\frac{2c_1}{d_1}\right]}} \right] \qquad \text{Eq. 2}$$

where $r_1$ is the inside radius of the inner ring 28, a the lattice spacing of the rings, l the separation between the rings in a given column in an axial direction, $d_1$ the separation between the rings in a radial direction, $c_1$ the width of each ring in a radial direction and $\sigma_1$ the resistance per unit length of each ring.

Figure 3A:
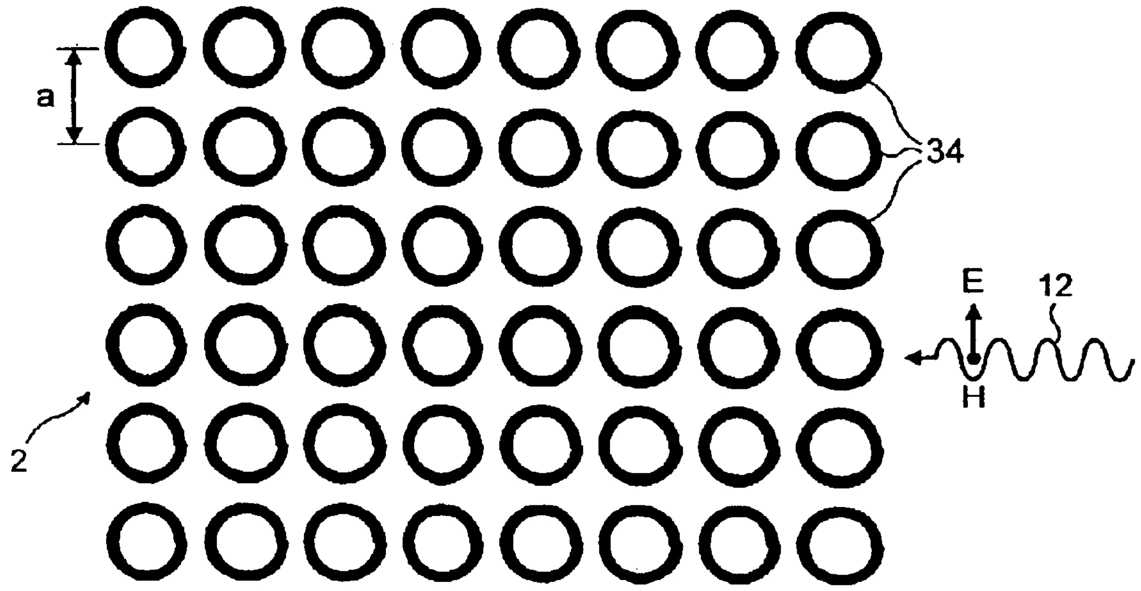
Figure 3B:
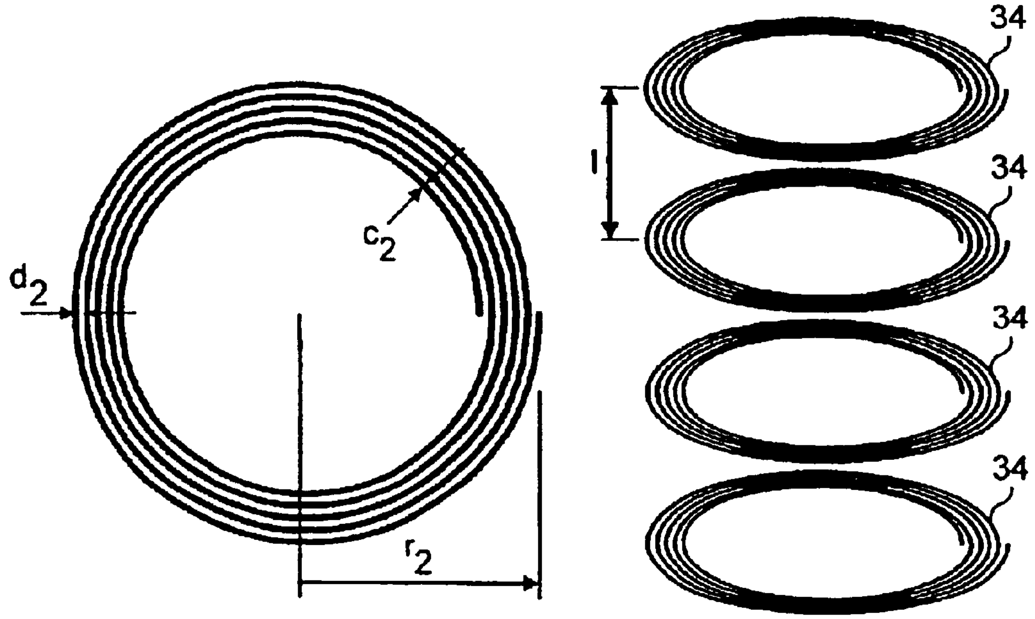

A further microstructured material described in United Kingdom Patent Application No. 2346485 (International Patent Application No. WO 00/41270) is constructed using a stack of conducting elements which comprise a single spiral shaped conductor 34 as illustrated in FIGS. 3(*a*) and 3(*b*).

It is also suggested that in United Kingdom Patent Application No. 2346485 (International Patent Application No. WO 00/41270) that the magnetic permeability of the structured material could he made to be switchable by incorporating an non-linear dielectric medium, such as Barium Strontium Titanate (BST) or other ferroelectric material, into the structure. The magnetic permeability of the structure is switched by changing the permittivity of the ferroelectric material by applying an electric field across the ferroelectric material. It is suggested that the ferroelectric material could be incorporated between the cylindrical tubes of each capacitive element (FIG. 1(*b*)) or between each of the concentric rings in a radial direction (FIG. 2(*a*)). The inclusion however of a ferroelectric material, such as BST, decreases the resonant frequency of the structure by a factor of more than 30 times. To increase the resonant frequency to a selected value to obtain the desired magnetic permeability at a given frequency requires the self capacitance of each capacitive element to be reduced by the same factor. When it is intended that the structured magnetic material is to operate at microwave frequency, that is in the GHz region, this would require a structure composed of capacitive elements which were impractical to fabricate. To overcome this problem it is proposed in United Kingdom Patent Application No. 2346485 (International Patent Application No. WO 00/41270) that the structure comprises an array of single, rather than concentric, cylindrical tubes each of which has two gaps running in an axial direction. A ferroelectric is provided in the gaps and the magnetic permeability switched by changing the permeability of the ferroelectric material using an electrical static switchable electric field. Although such a structured material is capable of operation at microwave frequencies it is impractical to fabricate capacitive elements sufficiently small for operation at radio frequencies in the MHz region. Furthermore even for microwave operation the construction of such a structured material is difficult and expensive.

The present invention has arisen in an endeavour to provide a structured material having a magnetic permeability which can be switched between selected values at a selected wavelength of operation, which can be readily fabricated and which is suitable for operation at radio frequencies (MHz).

According to the present invention there is provided a structure with switchable magnetic properties comprising an array of capacitive elements in which each capacitive element includes a low resistance conducting path and is such that a magnetic component of electromagnetic radiation lying within a predetermined frequency band induces an electrical current to flow around said path and through said associated element and wherein the size of the elements and their spacing apart are selected such as to provide a predetermined permeability in response to said received electromagnetic radiation, characterised in that each capacitive element comprises a plurality of stacked planar sections each of which comprises at least two concentric spiral conducting members which are electrically insulated from each other and which have a switchable permittivity material therebetween.

The magnetic permeability of the structure can be readily switched to a selected value by applying a static electric field across the switchable permittivity material. This is conveniently achieved by applying a dc voltage between the conducting spiral members of each capacitive element. In the context of this patent application the term spiral is to be construed broadly and is not restricted to a plane curve which is traced about a fixed point from which it continuously recedes. The term includes any unclosed loop of more than one turn which recedes away from a centre point. As such the term encompasses spirals which are square, rectangular, triangular, hexagonal or have other geometric forms.

Preferably the spirals are substantially circular in form. Alternatively they are square or rectangular in form.

Advantageously the switchable permittivity material comprises a ferroelectric material, preferably Barium Strontium Titanate. Alternatively it can comprise a liquid crystal.

Preferably the capacitive elements are arranged on a square array. Advantageously alternate spiral conducting members in a given row unwind in an opposite sense. With such an arrangement the structure advantageously further comprises electrically conducting connecting tracks connecting respective spiral members in a given column.

Preferably the structure is configured for operation at radio frequencies (MHz).

The structures of the invention are non-magnetic in a steady magnetic field.

Figure 4:
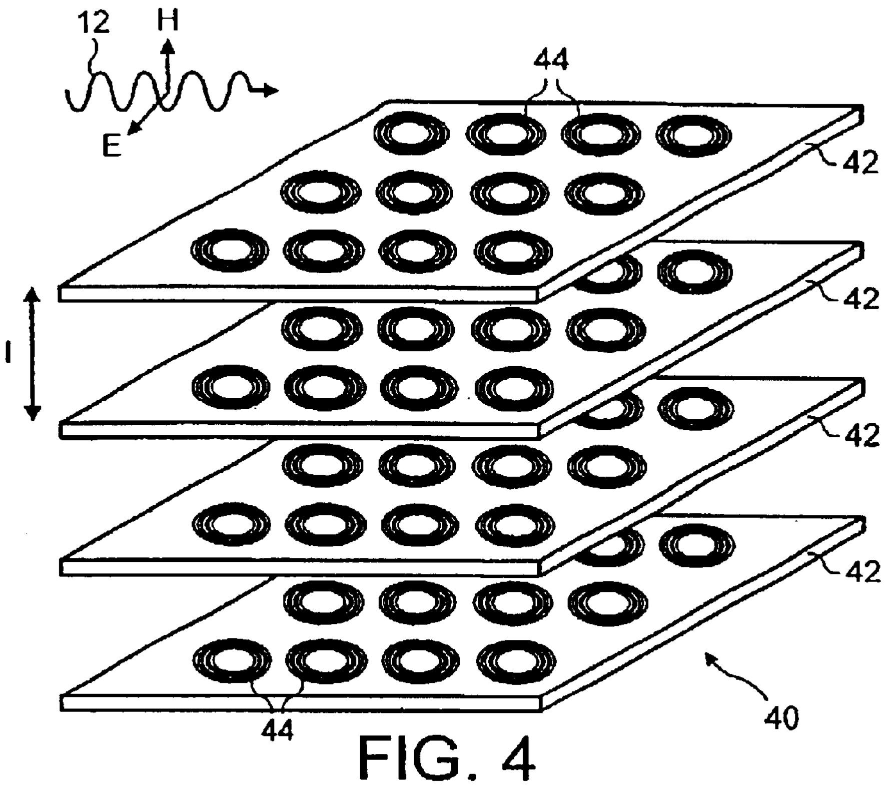
Figure 5:
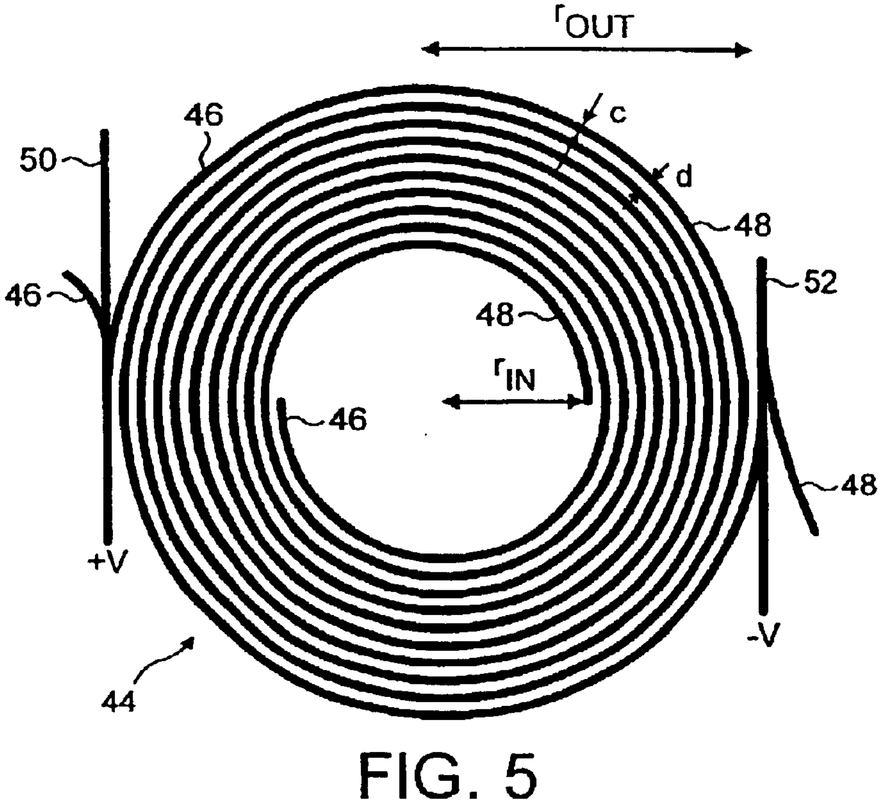
Figure 6:
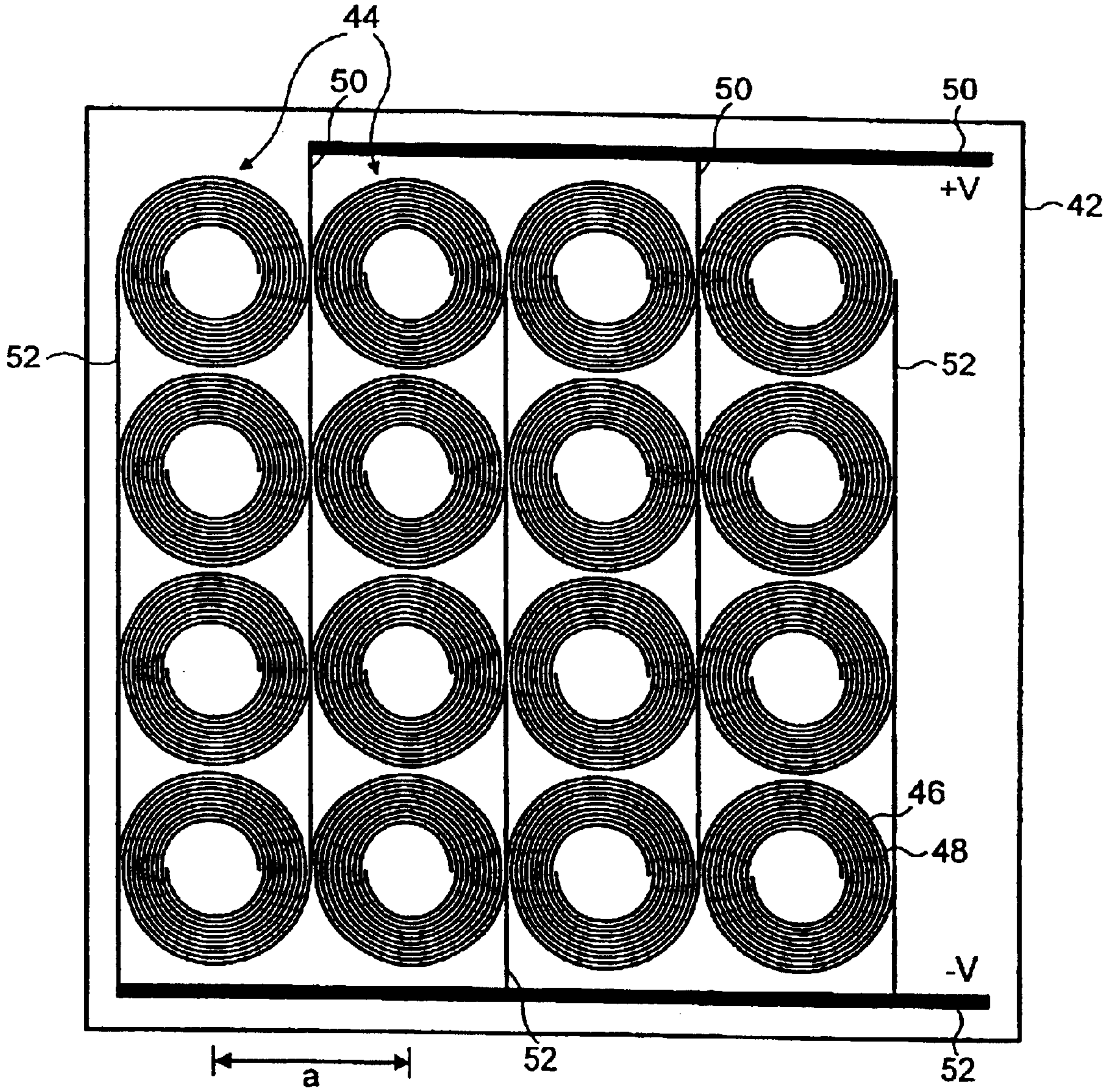
Figure 7:
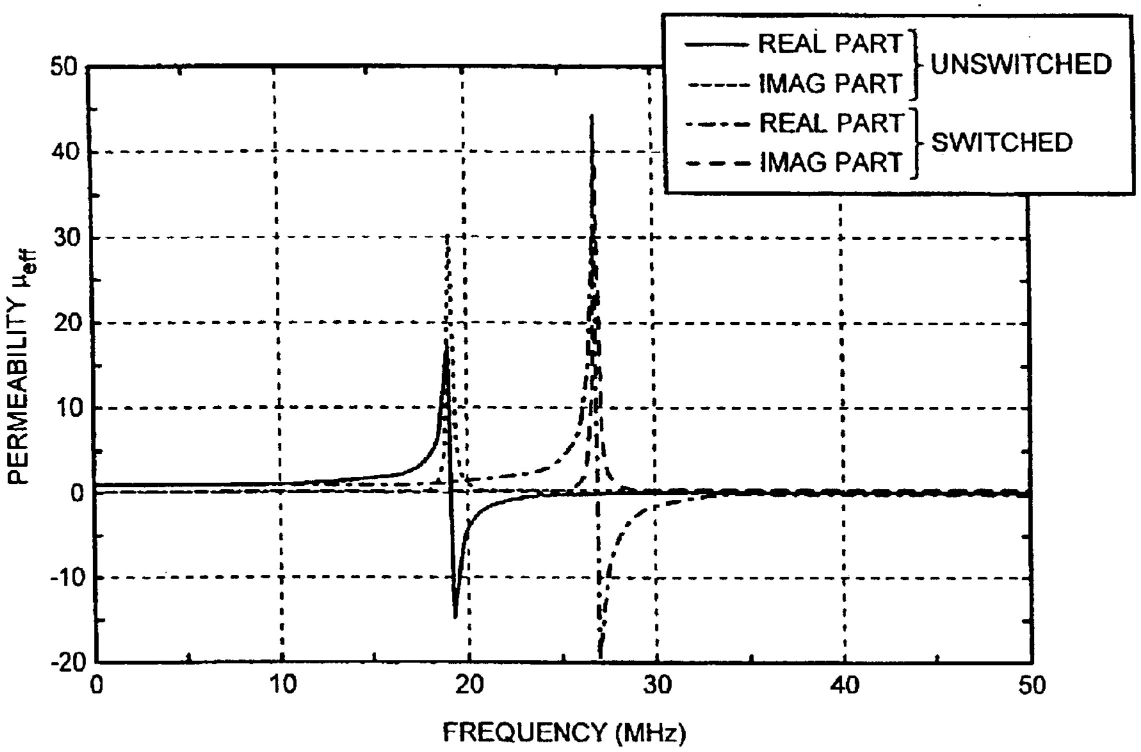
Figure 8:
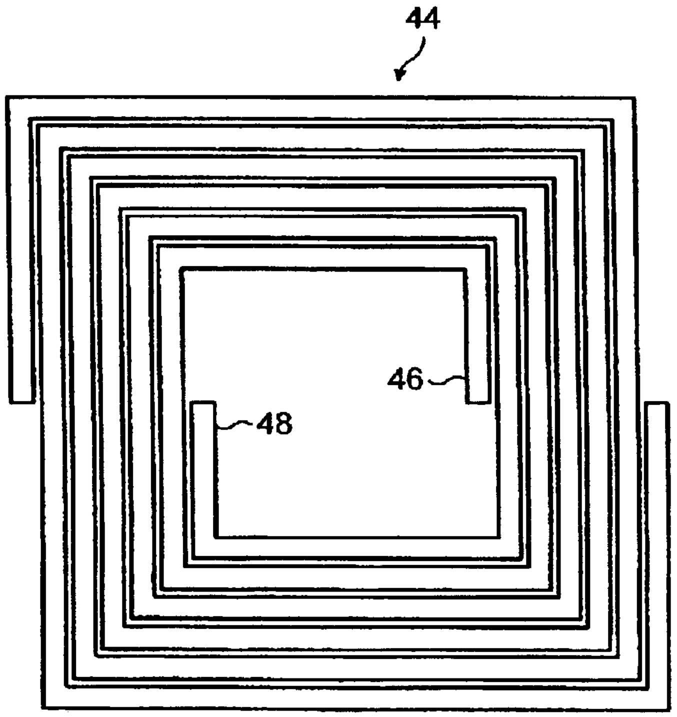

A structure with switchable magnetic properties in accordance with the invention will now be described by way of example only with reference to the accompanying drawings in which:

FIG. 1(*a*) a schematic representation of a known structured material having magnetic properties;

FIG. 1(*b*) an enlarged view of one of the capacitive elements of FIG. 1(*a*);

FIG. 2(*a*) a schematic representation of a further known structured material having magnetic properties;

FIG. 2(*b*) an enlarged plan view of one of the capacitive elements of FIG. 2(*a*) and a stack of such elements;

FIG. 3(*a*) a schematic representation of yet a further known structured material;

FIG. 3(*b*) an enlarged plan view of one of the capacitive elements of FIG. 3(*a*) and a stack of such elements;

FIG. 4 a schematic representation, in exploded view, of a structure with switchable magnetic properties in accordance with the invention;

FIG. 5 a plan view of one of the capacitive elements of the structure of FIG. 4;

FIG. 6 a plan view of a single layer of the structure of FIG. 4;

FIG. 7 a plot of the real and imaginary parts of the magnetic permeability as a function of frequency for the structure of FIG. 4 in an "unswitched" and "switched" state; and FIG. 8 a further form of capacitive element for use within a structure with switchable magnetic properties in accordance with the invention.

Referring to FIG. 4 there is shown a structure, or structured material 40, having a switchable magnetic permeability. The structure 40 comprises a stack of electrically insulating sheets 42 each of which has an array of electrically conducting capacitive elements 44 defined on its upper surface. For clarity the structure 40 in FIG. 4 is shown in exploded view with the sheets 42 separated. In practice however the sheets 42 are stacked on top of each other with the capacitive elements of one sheet 42 overlaying the corresponding elements 44 of adjacent sheets. The capacitive elements are separated by a distance l from their corresponding neighbours on the adjacent sheet. The sheets 42 comprise a glass fibre printed circuit board or other insulating material such as a polyamide thin film and the electrically conducting capacitive elements 44 are defined in the form of copper tracks using photolithography or other suitable technique.

Referring to FIG. 5 there is shown, in plan view, a single capacitive element 44. Each capacitive element 44 comprises two concentric electrically conducting spiral tracks 46, 48 of N turns; five turns in the case of the element illustrated. The two spiral tracks 46, 48 are electrically isolated from each other and each have an inner $r_{in}$ and an outer $r_{out}$ radius. Each spiral track 46, 48 is of width c and the tracks separated by a distance d in a radial direction. The resistance per unit length of the tracks is $\rho$. The gap running between the tracks 46, 48 is filled with a dielectric paint that is based on Barium Strontium Titanate (BST) ceramic powder. For ease of fabrication the BST paint is applied over the whole surface of each sheet 42. This material, which is ferroelectric, has a permittivity which is large and non-linear and can be switched by the application of a static electric field. An electric field can be applied across the BST by applying a dc electric voltage across the tracks 46, 48 using electrically conducting electrode tracks 50, 52. For the sake of clarity the electrode tracks 50, 52 are not shown in FIG. 4.

Referring to FIG. 6 a single sheet 42 is shown in plan view illustrating the layout of the capacitive elements 44 and the arrangement of the electrode tracks 50, 52. The capacitive elements 44 are arranged on a square array of lattice dimension $\alpha$. As illustrated in FIG. 6 the spiral elements 46, 48 within each row are alternately spiraled in an opposite sense. In contrast capacitive elements within each column have the same sense. This arrangement means that the outer most conducting track 46, 48 of adjacent capacitive elements are the same and can therefore be connected to the same electrode track. Whilst it is preferred for ease of connection to arrange the elements in this way it is not essential to the functioning of the structure and in alternative embodiments the spiral elements can have the same sense. A particular advantage of this arrangement is that it minimises the length of the electrode tracks 50, 52 required to interconnect each of the spiral tracks 46, 48 within a given sheet 42. This has the benefit of reducing the interaction of the structure 40 with the electric field component E when the structure is subjected to electro-magnetic radiation 12.

By assuming the width c of each spiral track is very much smaller than the radius of the spiral it can be shown that the magnetic permeability of the structure described is approximately:

$$\mu_{eff}(\omega) \approx 1 - \frac{\pi r_{out}^2 / a^2}{1 + \frac{\pi p l (N-2)\left[r_{in} + \frac{1}{2}N(c+d)\right]}{\omega \pi r_{in}^2 \mu_0 (N-1)^2} i - \left[\frac{1}{\pi r_{in}^2 \mu_0 (N-1)^2 \omega^2 8 \varepsilon \varepsilon_0 \frac{(c+d)}{l} \frac{\ln(2c/d)}{\ln(r_{out}/r_{in})}}\right]} \qquad \text{Eq. 3}$$

in which $\epsilon$ is the permittivity of the dielectric material between the spiral tracks 46, 48, $\epsilon_0$ and $\mu_0$ the permittivity and permeability of free space respectively and $i=\sqrt{-1}$. It can be seen from Eq. 3 that the magnetic permeability is dependent on the permittivity of the material between conducting spiral tracks 46, 48. Therefore the magnetic permeability of the structure can be switched to a selected value by appropriate switching of the permittivity. As described above, this is achieved by applying a potential difference −V, +V between the electrode tracks 50, 52 of each layer 42 of the structure.

When the structured material 40 is subjected to electromagnetic radiation 12 whose magnetic field H is perpendicular to the plane of the sheets 42, that is it is parallel with the axis of the capacitive elements 44 (as shown in FIG. 4), this induces an alternating electrical current in each of the conducting spiral tracks 46, 48. Since the electrically conducting spiral tracks 46, 48 of each element 44 are insulated from each other this prevents dc current flow. However there is considerable self capacitance between the tracks 46, 48, especially when each element 44 has a number of turns and this allows an ac electrical current flow between the inner and outer ends of the spiral tracks 46, 48. These induced electrical currents generate large inhomogeneous electric fields within the structure 40 which gives rise to the structure's magnetic properties. It will be appreciated that the magnetic properties of the structured material arise from the self capacitance of the element's 44 interacting with a magnetic component of a radiation rather than from any magnetism of its constituent components. If a dc (static) voltage (−V, +V) is applied to the electrode tracks 50, 52 this will apply an electric field across the ferroelectric material thereby changing its permittivity which in turn will change the magnetic permeability of the structured material.

An example of the performance of a structure made in accordance with the invention is shown in FIG. 7 for a structure in which $r_{in}$=5 mm, $r_{out}$=12.1 mm, c=0.5 mm, d=0.1 mm, N=5,l=0.5 mm and α=30 mm. The spiral tracks 46, 48 are made of copper with a resistance of 100 $\Omega m^{-1}$. The gap between turns of the spiral tracks 46, 48 is filled with BST whose permittivity in an "unswitched state", that is with no electric field applied, is equal to 200 and in a "switched state", that is with an electric field of 1 $kVm^{-1}$ applied, is 100. For the structured material 40 described such a field intensity corresponds to the application of 100V between the electrode tracks 50 and 52. FIG. 7 is a plot of magnetic permeability versus angular frequency in which the solid line represents the real part of the magnetic permeability for the structure in an "unswitched state", that is with no voltage applied between the electrodes 50 and 52, the dotted line represents the imaginary part of the magnetic permeability in an "unswitched state", the dashed/dotted line represent the real part in a "switched" state and the dashed line the imaginary part in the "switched state". As will be apparent from these plots the structure of the present invention exhibits a magnetic permeability having a resonance at radio frequencies (MHz) which can have negative values, large positive values and other values in between which can be selected by applying an appropriate dc potential to the electrode tracks.

The structure of the present invention will find many applications where it is desired to have a structure with switchable magnetic properties at a selected wavelength especially where there is a steady state magnetic field or a field gradient that should not be perturbed by the presence of the material. One example is in the field of magnetic resonance imaging (MRI). A structured material in accordance with the invention is particularly suited for use in MRI machines operating at 21.3 MHz. At this frequency of operation a structured material can be fabricated which, in the unswitched state has a negative permeability and hence acts as a screen for the radio frequency (rf) field used in such machines but does not affect a steady state magnetic field. In the unswitched state the material acts as a screen by reflecting rf radiation from its outer layer and additionally any radiation that penetrates the outer layers is rapidly attenuated. When the material is switched, by the application of a static electric field, the material has small positive magnetic permeability (i.e. $\mu<2$). For intermediate conditions the permeability may be positive or negative, large or small giving rise to either guiding or screening properties depending on the voltage applied to the electrode tracks. It will be appreciated therefore that a structure whose permeability can be changed in real time allows an MRI machine to be reconfigured as desired. For example as described in our co-pending United Kingdom Patent Application No. 0005354.6 it is proposed to use an array of sensing coils for receiving magnetic resonance signals from a desired region of a patient. Screens made of a structured material in accordance with the invention having switchable magnetic properties are provided between the coils. By appropriate switching of the magnetic permeability of the screens the effective region viewed by each coil can be varied.

It will be appreciated that the present invention is not restricted to the specific embodiment described and that variations can be made that are within the scope of the invention. Whilst the capacitive elements are preferably in the form of two concentric circular spiral tracks other forms of capacitive elements could be used such as for example, a double spiral which is square in form as illustrated in FIG. 8. Furthermore each spiral track or member could be any form of an unclosed loop of more than one turn such as for example triangular or other geometric form. A particular advantage of a spiral shaped conducting track of a number of turns is that it is intrinsically small and has a large self capacitance for a given size of capacitive element. This small size of element enables a structured material to be fabricated which is capable of operation at radio frequencies.

Furthermore in alternative embodiments it is envisaged to incorporate additional conducting tracks into the spiral element. It will be appreciated that other ferroelectric materials could be incorporated into the structure such as for example a liquid crystal which could be provided over the whole surface of each sheet.

Whilst arranging the capacitive elements in the form of a square array is convenient for interconnecting the respective tracks of the capacitive element within a given sheet, the capacitive elements can alternatively be arranged in different arrays.

What is claimed is:

1. A structure with switchable magnetic properties comprising: an array of capacitive elements, the array exhibiting a predetermined magnetic permeability in response to incident electromagnetic radiation lying within a predetermined frequency band, in which each capacitive element includes a low resistance conducting path and is such that a magnetic component of the electromagnetic radiation lying within the predetermined frequency band induces an electrical current to flow around said path and through said associated element, wherein the spacing of the elements is less than the wavelength of the radiation within the predetermined frequency band, wherein the size of the elements and their spacing apart are selected such as to provide the predetermined permeability in response to received electromagnetic radiation, and wherein each capacitive element comprises at least two concentric spiral conducting members which are electrically insulated from each other and which have a switchable permittivity material therebetween.

2. A structure as claimed in claim 1, in which the switchable permittivity material comprises a ferroelectric material.

3. A structure as claimed in claim 1, in which the switchable permittivity material comprises Barium Strontium Titanate.

4. A structure as claimed in claim 1, in which the switchable permittivity material comprises a liquid crystal.

5. A structure as claimed in claim 1, in which the capacitive elements are arranged in a planar array.

6. A structure as claimed in claim 5, in which alternate spiral conducting members in a given row unwind in an opposite sense.

7. A structure as claimed in claim 5, including a plurality of planar arrays arranged in a stack.

8. A structure as claimed in claim 7, and further comprising electrically conducting connecting tracks connecting respective spiral members in a column of spiral conducting members.

9. A structure as claimed in claim 1, in which the spacing of the elements is less than one half of the wavelength of the radiation within the predetermined frequency band.

10. A structure as claimed in claim 1, in which the spacing of the elements is less than one fifth of the wavelength of the radiation within the predetermined frequency band.

11. A structure as claimed in claim 1, in which the spacing of the elements is less than one tenth of the wavelength of the radiation within the predetermined frequency band.

12. A structure as claimed in claim 1, in which the structure exhibits a negative magnetic permeability over at least a part of the predetermined frequency band.

13. A structure as claimed in claim 1, in which the predetermined frequency band is within the band extending 3 MHz to 300 MHz.

14. A structure as claimed in claim 13, in which the predetermined frequency band is within the band extending from 3 MHz to 30 MHz.

* * * * *